INVENTOR.
WARREN H. BLISS
BY
George J. Craig
ATTORNEY

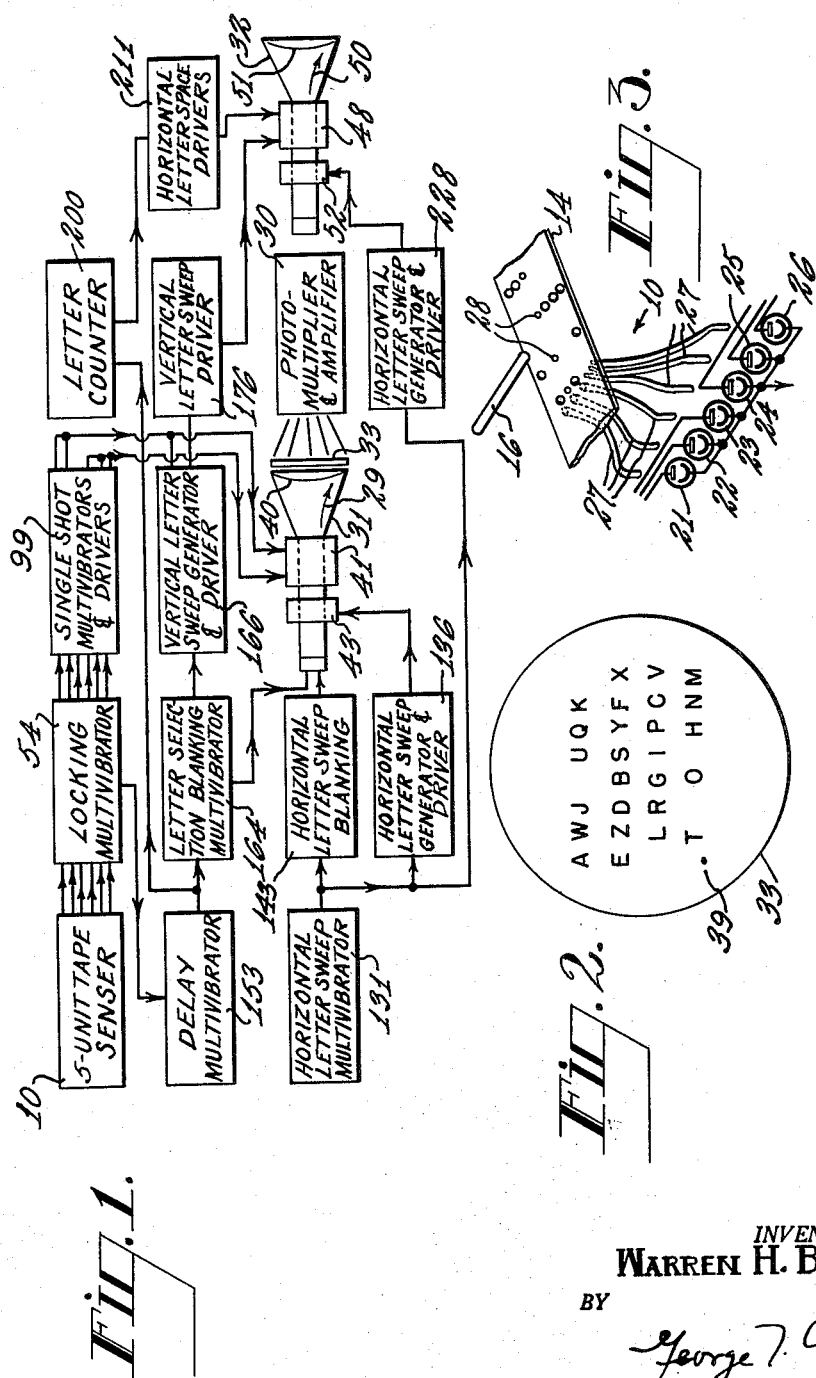

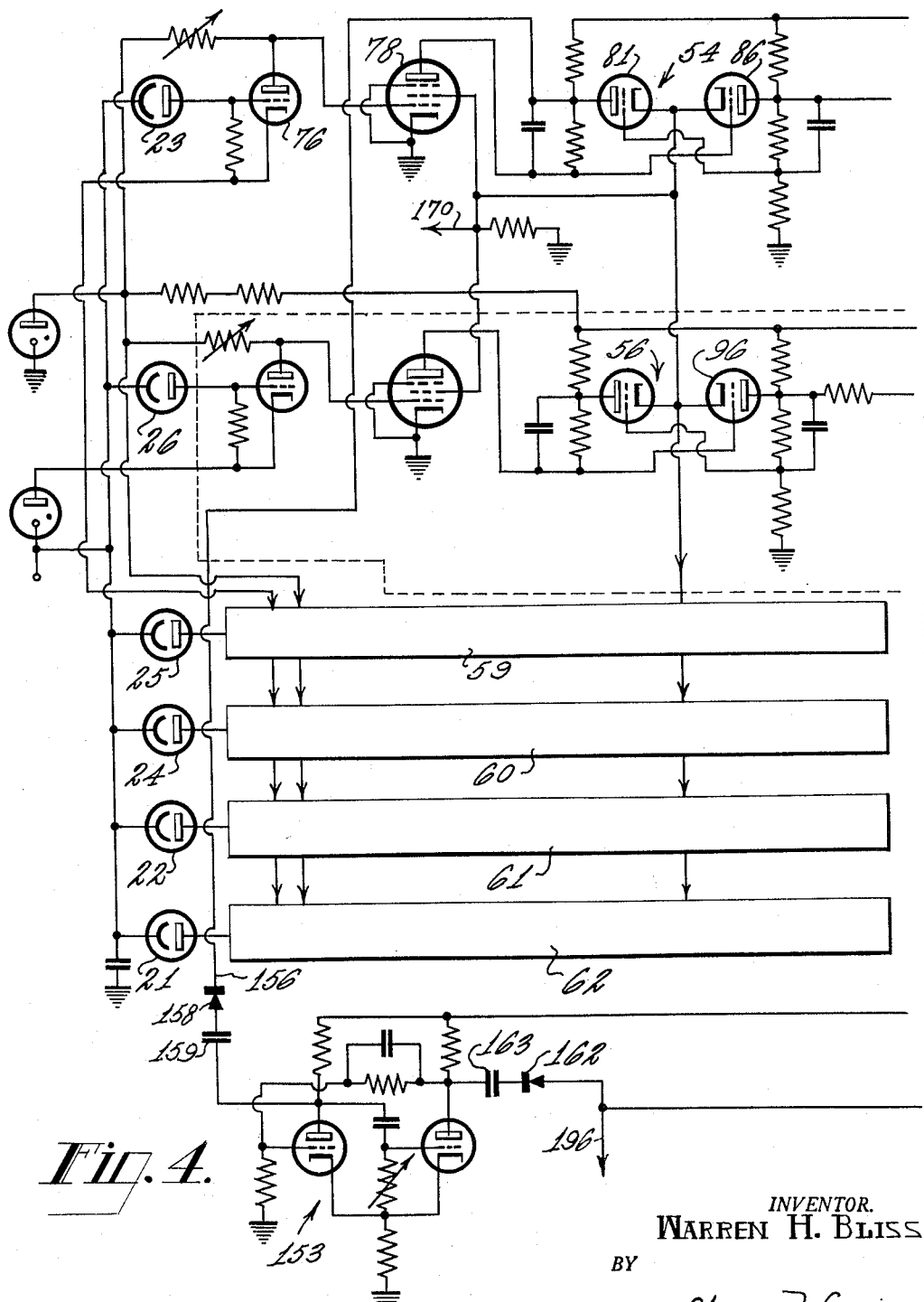

Aug. 19, 1958  W. H. BLISS  2,848,534
CODE TRANSLATOR
Original Filed March 1, 1951  8 Sheets-Sheet 4

INVENTOR.
WARREN H. BLISS
BY
George J. Craig
ATTORNEY

Aug. 19, 1958     W. H. BLISS     2,848,534
CODE TRANSLATOR

Original Filed March 1, 1951     8 Sheets-Sheet 7

INVENTOR.
WARREN H. BLISS
BY
George J. Craig
ATTORNEY

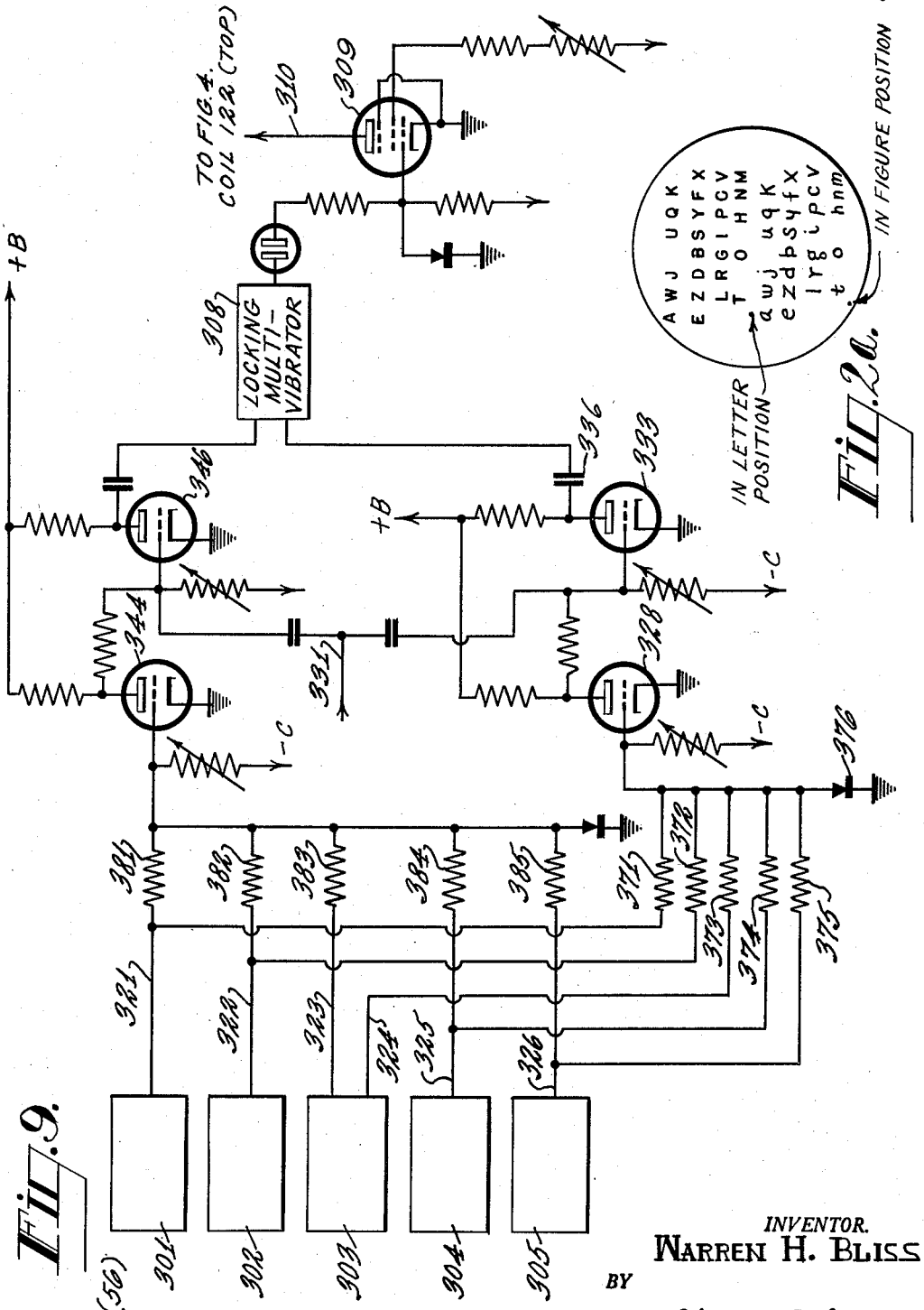

United States Patent Office 2,848,534
Patented Aug. 19, 1958

2,848,534

CODE TRANSLATOR

Warren H. Bliss, Princeton, N. J., assignor to Radio Corporation of America, a corporation of Delaware Original application March 1, 1951, Serial No. 213,389, now Patent No. 2,762,862, dated September 11, 1956. Divided and this application July 3, 1956, Serial No. 595,798

8 Claims. (Cl. 178—26)

The present invention relates to the selection of indicia, including readable characters, by code controlled means; and more particularly, but not necessarily exclusively, to novel means for translating code signals. This invention is a division of my copending application Serial No. 213,389, which was filed on March 1, 1951, now Patent No. 2,762,862, granted September 11, 1956.

In the setting of the present invention, an arrangement is provided for selecting and electronically producing a letter of the alphabet, for example. The selected letter is shifted, preferably by electronic means, to fit into an intelligible arrangement of similar letters. Initial production of the letter is obtained by a selector operated by code sensing means. Counter circuits are employed for arranging a series of selected letters in intelligible order. The resulting intelligible arrangement of letters is recorded by photographic means, for example, or by other means. Suitable recording mediums may be employed which are sensitive to visible or invisible radiant energy. Photographic methods of recording are responsive to visible as well as invisible radiation and are, therefore, suitable. Radiation controlled electrostatic patterns may be employed for recording. Any suitable kind of code presenting medium may be used with the invention including transparent tape marked with code characters, punched tape or magnetic tape.

In accordance with the present invention, a novel arrangement is provided for converting coded information into selection signals for performing a selecting function or functions. In the illustrative embodiment, an equal unit code, a five unit code for example is converted to weighted deflection values.

An object of the invention is to provide a novel way for the code controlled selection of discrete indicia, and for the arrangement of the selected indicia in intelligible form.

A further object is to provide novel means for the electronic selection and/or arrangement of indicia by code controlled means.

A still further object is to provide novel means for the conversion of five unit code signals into a form suitable for cathode ray beam deflection.

Other objects and advantages of the invention will, of course, become apparent and immediately suggest themselves to those skilled in the art to which the invention is directed from a reading of the following specification in connection with the accompanying drawings in which:

Fig. 1 is an overall block diagram of apparatus embodying the invention for selecting and arranging characters or other indicia;

Fig. 2 is a view of the character defining means of the invention representing characters disposed for selection;

Fig. 2a is a view similar to Fig. 2 which shows two areas each presenting a group of characters to be selected;

Fig. 3 is a schematic showing of an arrangement suitable for deriving code signals representing letters of the alphabet or other indicia;

Figs. 4 and 4A are to be combined as a schematic diagram of one of the principal units shown by Fig. 1;

Fig. 9 shows, schematically, an arrangement in accordance with the invention for selecting an additional set of character defining means.

Figure 4A:
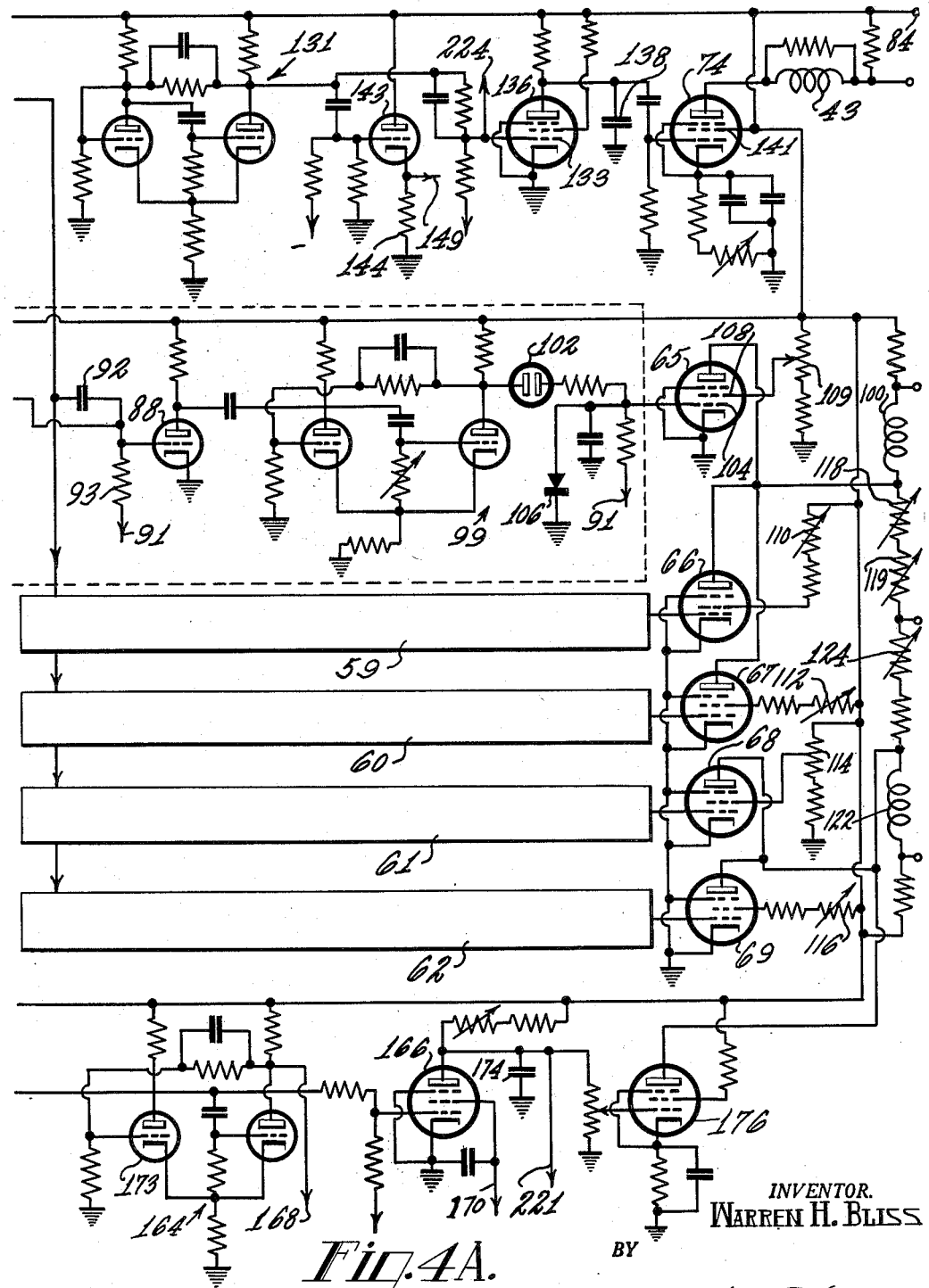

Fig. 1 of the drawings is a comprehensive showing of apparatus embodying this invention which selects indicia such, for example, as letters of the alphabet and arranges the indicia in a desired order or pattern. In practicing the invention, letters of the alphabet may be selected and arranged to form words and sentences. The parts of the apparatus indicated by blocks in Fig. 1 are illustrated by other figures of the drawing and will be described more in detail herein. These blocks are designated in Fig. 1 by the reference character assigned hereinafter to the principal component of the apparatus in the block. A detailed showing of the apparatus in each block is given in Figs. 4, 4A, 6 and 7.

Reference numeral 10 (Fig. 1) designates a code reader or senser which may be of any desired kind or type for handling a code bearing medium. In the illustrative example, the code senser 10, as shown in Fig. 3 of the drawings, operates with punched tape 14 bearing code punchings in accordance with the well-known five-unit telegraph printing code. The apparatus of Fig. 3 may, if desired, include features shown in Zworykin Patent No. 1,753,961, granted April 8, 1930. A patent to Cremer, 1,828,556 dated October 20, 1931, also discloses a code senser or transmitter suitable for purposes of carrying out this invention.

Fig. 3 of the drawing shows a fragment of a strip of tape 14 having code punchings. The punchings represent the letters IZM. The light source 16 is provided for projecting light through the punched holes in the tape onto a set of six phototubes 21 to 26 (Figs. 3 and 4). Suitable means, such as quartz rods 27, are provided to guide the light from a hole in the tape onto its corresponding phototube. The type of tape shown, illustratively, has a series of sprocket holes 28 for driving the tape and phototube 23 receives light projected through the sprocket holes as the tape moves. It will be understood that any suitable motor may be employed to drive the means for moving the tape. It will be also understood that, as pointed out above, magnetic tape may be employed with magnetic pick-up devices. The tape 14 may be transparent with opaque tape markings thereon. Since the selection and scanning of each letter is triggered individually, apparatus embodying the invention will operate at any speed from its maximum or top value down to a few characters per second. The tape drive speed is not critical and does not bear any synchronous relationship to operation of the apparatus.

The receiving and recording arrangement of Fig. 1 includes two flying spot cathode ray tube scanners or kinescopes 31 and 32. The principle of the flying spot scanner is shown in Patent No. 2,104,066 granted to V. K. Zworykin on Jan. 4, 1938. A slide or mask 33 is interposed between the flying spot tube scanner 31 and a phototube 30 (Fig. 6) included in the block 30 of Fig. 1. An amplifier comprising tubes 35, 36 and 37 (Fig. 6) is provided for the phototube output. The slide 33 may, if desired, be in the form of a mask applied directly to the face of the kinescope 31 as indicated by Fig. 2. The cathode ray beam 29 excites the phosphor 40 in the tube 31 to provide a light output. The indicia may be opaque, or transparent on an opaque field. The mask is divided into squares which correspond to components of deflection superimposed on the raster deflection means of the kinescope. For example, the square inscribed with the letter I is reached by deflecting the beam four units horizontally and one unit vertically from the "rest" position of the beam. In the rest position, the beam is extinguished. However, the resultant deflection forces would position the unextinguished beam at the rest point. In the illustrative example, the beam rest position is at the point 39 on Fig. 2. A sweep component is added to the vertical deflection component which effects selection. Properly applied deflection currents or voltages normally maintain the beam in the rest postion, and steady deflection components to select a square on the mask 33 vary these steadily applied deflection components. Alternatively, and more simply, the well-known gun structure of the kinescope 31 may be located so as to direct the beam to the portion of the screen occupied by the square representing the rest position in the absence of coordinate deflection voltages or currents. A deflection yoke is indicated by reference character 41. This yoke may be of the kind fully described in Patent No. 2,428,947 granted to C. E. Torsch on Oct. 14, 1947. The coordinate deflection currents may be superimposed on the windings of the yoke 41. In the illustrative example, an auxiliray yoke 43 is provided which surrounds the yoke 41 or lies adjacent to it. The electron beam of the cathode ray tube is deflected over a scanning pattern or raster, this raster having an area sufficient only to cover one of the selected indicia squares of the mask 33. The scanned raster may be similar to the raster produced in a television tube, but it need not be interlaced.

The kinescope 32 is provided with a deflection yoke 48 which is or may be similar to the yoke 41 described in connection with the kinescope 31. This provides deflection of the cathode ray beam 50 over the phosphor 51.

Figure 7:
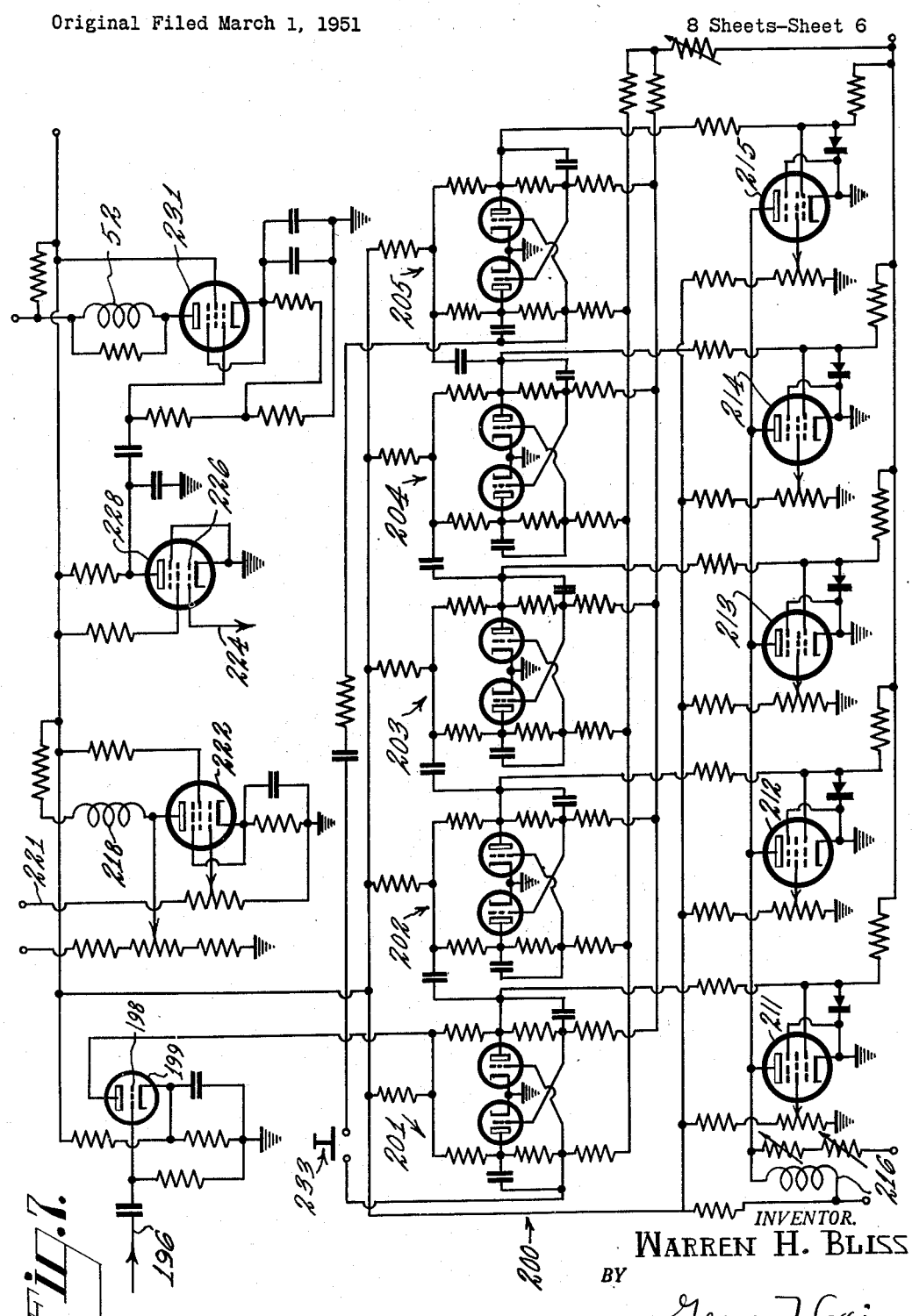
Fig. 7 shows schematically further detail of the unit of Fig. 1 which is partially shown in Fig. 6.
Figure 8:
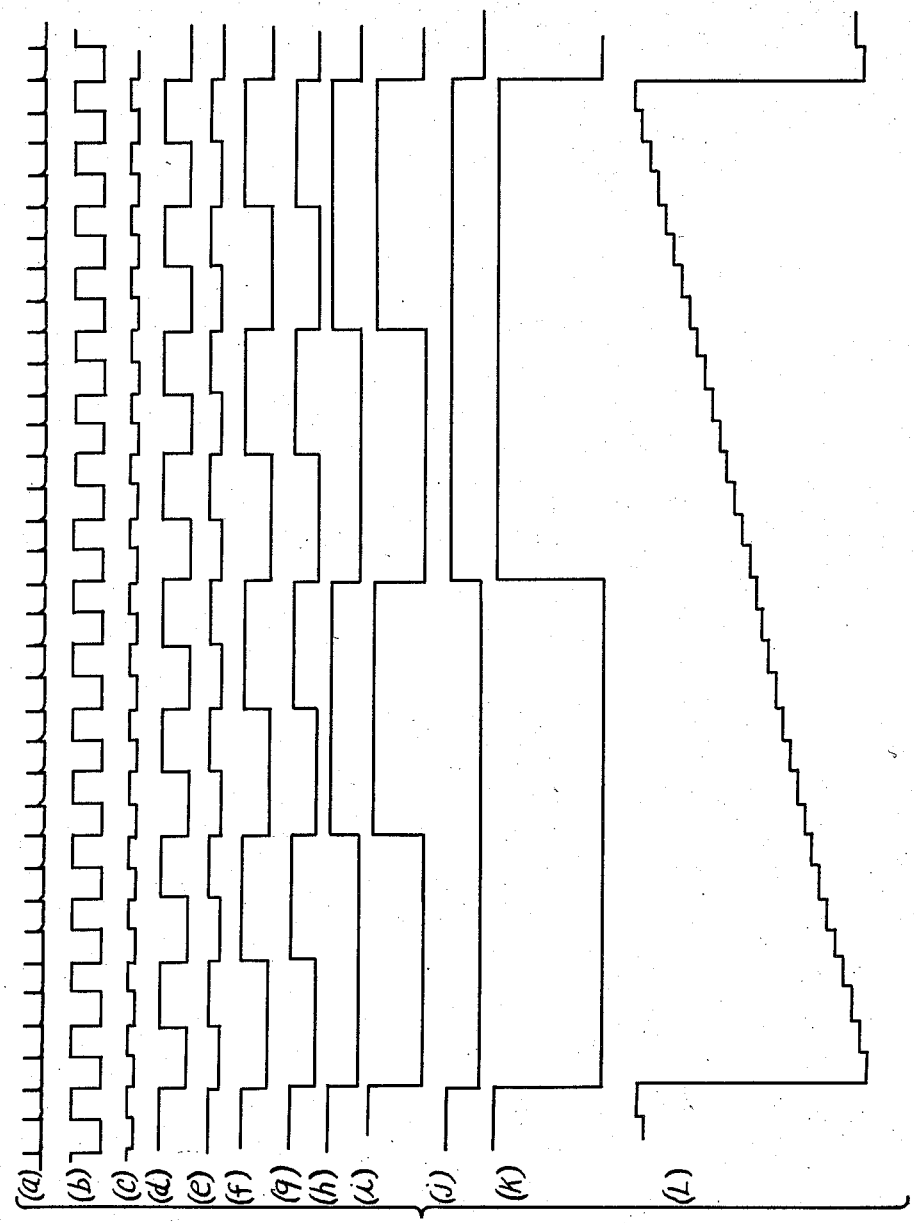
Fig. 8 shows a series of waveforms used in explaining the operation of the apparatus of Fig. 7.

The yoke 48 receives deflection currents as shown in detail by Figs. 7 and 8. A suitably disposed auxiliary yoke 52 is provided for the kinescope 32. It will be understood, in the description which is to follow, that the terms vertical and horizontal are used herein merely to designate components of scanning and do not necessarily have any relationship to the position in space of the target faces of the kinescopes 31 and 32. Recordings may be obtained by any apparatus or process from the face of the kinescope 32.

Referring to Figs. 4 and 4A of the drawing, a detailed description will now be given of the arrangement in accordance with the invention for producing deflection of the beam in the kinescope 31 so as to effect character selection and character production. The output from the phototube 23 serves to cause operation of a locking multivibrator 54. The phototube 26 causes operation of a locking multivibrator 56, while the phototubes 21 to 26, as shown in Fig. 4, are labelled to correspond with those appearing in Fig. 3 which are coordinated with the tape fragment appearing in Fig. 5, line b. The phototubes 25, 24, 22, and 21 are connected through channels, schematically shown as rectangles, designated 59, 60, 61 and 62 respectively to driver tubes designated respectively by reference characters 65, 66, 67, 68 and 69. The channels 59 to 62 embrace the same equipment as that shown between the phototube 23 and a driver tube designated by reference character 74.

The phototube 23, as seen from Fig. 3 of the drawing, is responsive to the uniformly spaced sprocket holes in the tape 14 and its output is amplified in a known or usual way by an amplifier tube 76. A tube 78 causes the tube 81 of the locking multivibrator 54 to become conductive when the phototube 23 receives illumination through one of the sprocket perforations in the tape 14. The source of positive plate voltage for the tube 78 and the tubes of the multivibrator 54 is obtained from a regulated source of direct current voltage (not shown) applied to the terminal 84. When the right-hand tube 86 of the multivibrator 54 is turned off, a pulse is applied to a gate amplifier tube 88.

Figure 5:
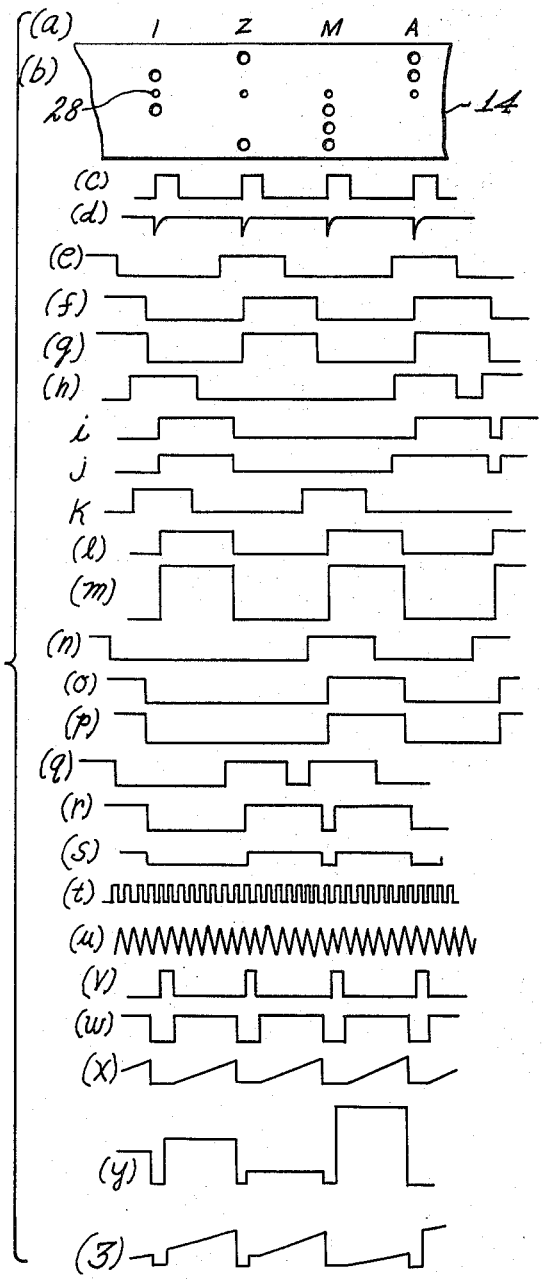
Fig. 5 shows a series of waveforms used in explaining the operation of the apparatus of Figs. 4 and 4A.

When standard tape of the kind shown in Figs. 3 and 5 is used as a source of coded information, advantage is taken of the small size of the sprocket holes to provide for a delay in operation of the multivibrator 54. Due to the fact that the sprocket hole is smaller than the intelligence pulse holes, the associated locking multivibrator 54 is not tripped until a time somewhat later than the other multivibrators as shown by the time relationship of the waveform c of Fig. 5. This results in a retarded positive polarity being applied to all five gate amplifiers corresponding to and including the tube 88 after certain ones of them have been primed or made ready by the occurrence of an intelligence pulse hole on the tape. The letter I, for example, causes operation of the locking multivibrator in the channel 61 and the locking multivibrator in the channel 60. The delay means is provided to obtain operation of all of the channels simultaneously. In the illustrative example, the gate tube 88 has its grid connected to a source of negative potential from a power supply source 90 (Fig. 6) as indicated at 91. The output of the locking multivibrator 54 is differentiated by a condenser 92 and a resistor 93. The tube 88 reverses the phase of the differentiated wave and clips off the positive pulses, leaving the negative-going pulses as indicated by curve d of Fig. 5. The curve d is shown as being continuous and representing the combined output of all of the gate amplifier tubes. It will be understood, however, that the gate amplifier tube 88 will produce the negative pulses as shown in curve d only when the phototube 26 is illuminated. Assuming that phototube 26 receives illumination, the right hand tube 96 of the multivibrator 56 is not conducting and, therefore, a positive potential is applied to the grid of the gating tube 88, permitting it to repeat a pulse from curve d. It will be understood that other retarding means may be used, such as a delay multivibrator coupled to the output of the multivibrator 54 and to the grid of the gating amplifier 88. If this last-named plan is employed, the phototube 23 will be omitted and a continuous series of pulses can then be obtained from the combined pulse outputs of the phototubes 21, 22, 24, 25, and 26.

Figure 6:
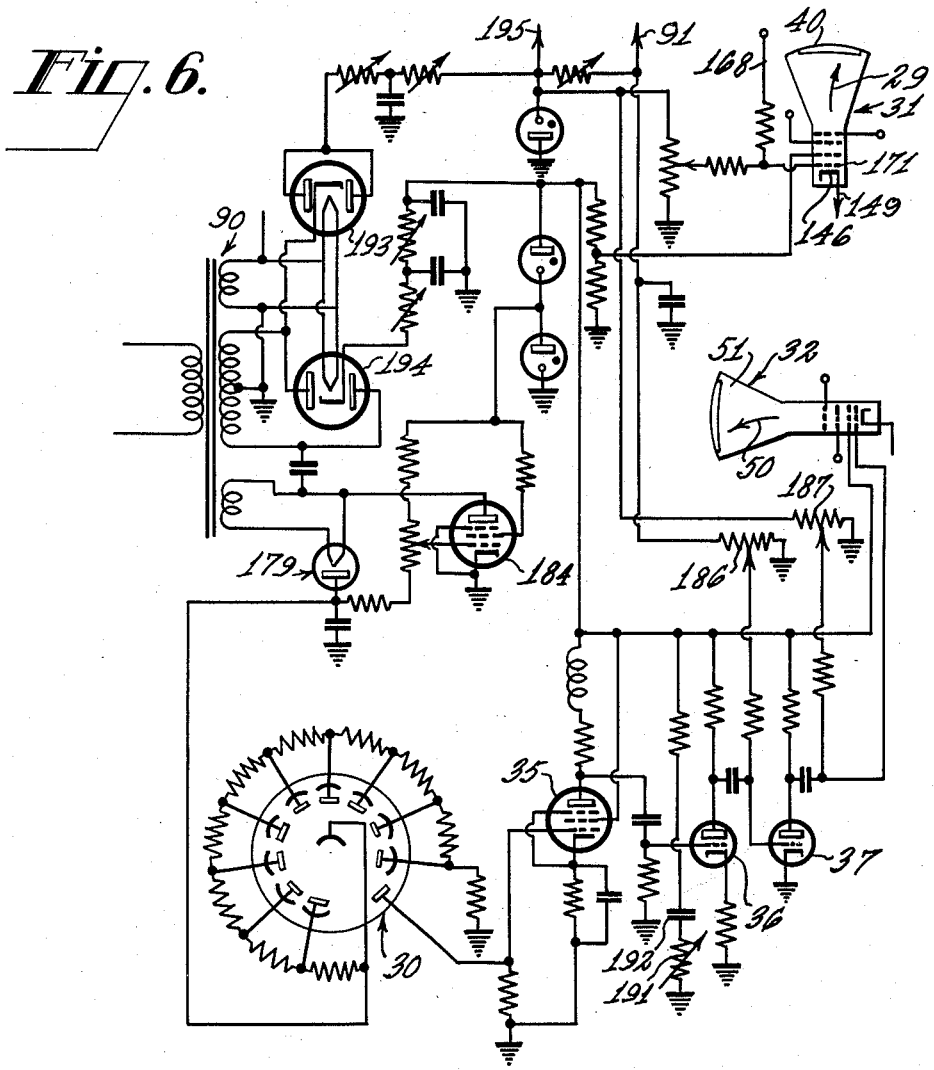
Fig. 6 shows schematically details of another of the principal units shown by Fig. 1.

The output of the gating amplifier 88, in the form of a negative pulse when the phototube 26 is illuminated, as pointed out above, is applied to control a single shot multivibrator 99. The single shot multivibrator 99, as well as those in the channels 59 to 62 are conventional and develop square top pulses whose length is adjusted in accordance with the maximum speed of operation of the system. The output of the single shot multivibrator 99 is shown by curve r of Fig. 5. The output from the multivibrator 99 is taken through a glow tube 102 and applied to the grid 104 of the deflection driver tube 65. The grid 104 is connected to the negative source of biasing potential 91 (Fig. 6). A diode 106, which may be a crystal rectifier, has for its purpose to help hold the plate current of driver tube 65 constant during conduction time. The input conditions are such that the grid of the tube 65, as well as the tubes 66 to 69, could be driven positive, but the diodes conduct and hold the grids at essentially cathode potential.

The screen grid 108 of the tube 65 is connected to the sliding tap of a potentiometer 109 so that the level of output current in the tube 65 may be set. The current level of the tube 65 is such that it represents one unit of horizontal deflection in the horizontal deflection coil 100 in the yoke 41 as indicated by a curve s of Fig. 5. The current level of the tube 66 is set to provide two units of horizontal deflection by the adjustment of the screen grid resistor 110. This is illustrated by curve p of Fig. 5. The output current for the tube 67 is set to provide four units of deflection by the screen grid resistor 112 as shown by curve *m* of Fig. 5. The voltage at the screen grid of the tube 68 is controlled by a potentiometer 114 so that its current output represents one unit of vertical deflection as shown by curve *j* of Fig. 5. The screen grid resistor 116 for the tube 69 is set so that it provides two units of vertical deflection as shown by the curve *g* of Fig. 5. Suitable centering means for the horizontal deflection coil 100 are indicated by variable resistors 118 and 119. Vertical centering for the vertical deflection coil 122 is provided by the variable resistor 124. The junction of the resistors 119 and 124 is connected to a source of high positive voltage. In the illustrative example, this is 550 volts positive and the terminal 84 is connected to a 250 volt source. The coil 122 forms the vertical deflecting means of the yoke 41.

In addition to locating the beam in the kinescope 31 on the portion of the beam target corresponding to a selected letter, it is necessary to deflect the beam vertically and horizontally over the relatively small area assigned to each character or letter. In the illustrative arrangement, shown more in detail by Fig. 4A, horizontal sweep within the character area is provided by the auxiliary deflecting coil 43 previously referred to as an auxiliary horizontal yoke or coil. Horizontal scanning deflection within the character area on the tube face is generated under control of a free running multivibrator 131 of a well-known type. This multivibrator produces discharge pulses as shown by curve *t* of Fig. 5. It is to be noted that the horizontal sweep for the character area scanned need not be synchronized with the code reading apparatus. Deflection for scanning the character area by the kinescope 32 is also controlled from the multivibrator 131. The output wave from the multivibrator 131 is applied to the grid 133 of a discharge tube 136. The tube 136 allows a condenser 138 to produce the horizontal letter sweep or sawtooth wave of curve *u* in Fig. 5. This operation is by now well-known since the condenser 138 charges from the source 84 and is discharged during conductive time of the tube 136. The produced sawtooth is applied to the grid 141 of the driver tube 74 so that this tube drives a sawtooth of current through the coil 43.

Return line blanking during letter area scan in the kinescope 31 is provided by a blanking tube 143. The pulses shown by line *t* of Fig. 5 are applied to the grid of the tube 143 and the output is taken across a cathode resistor 144 and applied to the cathode 146 (Fig. 6) of the kinescope 31. The blanking connection is shown schematically at reference character 149 on Figs. 4 and 6.

Vertical deflection over the character area in the kinescopes 31 and 32 is provided under control of a delayed single shot or single stroke multivibrator 153, the output of which appears as curve *v* in Fig. 5. The multivibrator 153 has its delay characteristic set to hold off the vertical letter sweep or scan until the letter selection deflection currents have been esstablished in the yoke coils. The multivibrator 153 is triggered from the locking multivibrator 54 over a conductor 156. This connection includes a rectifier 158 and a coupling condenser 159. The negative going output pulses from the multivibrator 54 are differentiated, the rectifier 158 passing the first short negative going pulse to trip the multivibrator and suppressing the short positive going pulse.

The output of the delay multivibrator 153 is a series of positive going pulses as shown by curve *v* of Fig. 5, the duration of these pulses being determined by the restoring time of the multivibrator as is well known in the art. A rectifier 162 and a condenser 163 are employed to couple the multivibrator 153 to a second single shot multivibrator 164 which serves to provide blanking pulses and which controls operation of the vertical discharge tube 166. The pulse wave of curve *v* of Fig. 5 is differentiated and the rectifier 162 suppresses the initial short positive going pulse permitting the following negative going pulse to trip the multivibrator 164 after a time interval determined by the operation of the multivibrator 153. The output of the multivibrator 164 appearing in the lead 168 (Figs. 4A and 6) is represented by curve *w* of Fig. 5. This wave consisting of positive going pulses during the sweep interval is applied to the grid 171 of the kinescope 31.

Positive going pulses of blanking time duration from the plate of the left-hand tube 173 of the multivibrator 164 are applied to cause conductivity in the tube 166 thereby to discharge the condenser 174 to provide for retrace. The current output of the vertical scanning driving tube 176 is added to the vertical selecting current flowing in the vertical deflection coil 122. Conductor 170 supplies screen voltage for the tubes 78 and 166, and other tubes, by way of the space current path or paths in the multivibrator 54 and corresponding multivibrators in the other channels.

Fig. 6 of the drawing shows the circuit of the previously mentioned phototube 30 in which a video type of signal is developed from the face of the kinescope 31. Patent No. 2,506,668, granted to Harold E. Haynes on May 9, 1950, illustrates the use of a photomultiplier phototube similar to that indicated by reference character 30 herein. This phototube may be a 931–A type. A negative polarity high voltage source for the phototube 30 is indicated generally by reference character 179 and a regulator tube 184. The output of the phototube 30 is amplified, as stated above, by the tubes 35, 36, and 37. The two last-named tubes operate as limiters to clip the video letter signals on top and bottom to eliminate any amplitude irregularities. Potentiometers 186 and 187 provide a means for adjusting the grid bias of the tube 37 and the bias on the grid of the kinescope 32. A variable resistor 191 in series with a condenser 192 in the cathode circuit of the tube 36 provides a small amount of phosphor characteristic compensation for the kinescope 31.

The power supply 90 shown in Fig. 6 also includes rectifier tubes 193 and 194. Tube 193 is connected to provide regulated negative bias for the indicated points 195 and 91 in the circuits. Tube 194 serves in a known manner to provide a positive voltage supply.

Fig. 7 of the drawing shows the recorder control circuit which is included in the schematic showing of Fig. 1. The major part of the arrangement of Fig. 7 controls the disposition of selected letters in a row on the face of the kinescope 32. Incoming pulses, one per letter or space, are applied from the delay multivibrator 153 of Fig. 4 over a conductor 196 to the grid 198 of the tube 199 which serves as a driver for a five-stage binary counter chain indicated generally by reference character 200. This counter chain uses conventional locking type multivibrators 201 to 205 with a total capacity of 32 counts. Electronic counters employing multivibrators similar to those shown illustratively on Fig. 7 of the drawing are discussed in an article entitled "Electronic Digital Counters" by Warren H. Bliss, appearing in the April 1949 issue of Electrical Engineering. Each multivibrator controls a component of horizontal deflection through its associated driver tube. These driver tubes are designated 211 to 215. The magnitudes of the driver tube output currents are indicated by curves *c*, *e*, *g*, *i*, and *k* on Fig. 8 of the drawing. Since the deflection current components are also weighed on a binary scale basis, the total current used for deflection is proportional to the count. The waveforms of Fig. 8 show the counter operation and the components of the horizontal deflection current. Curve *l* shows the total current having 32 equal steps or increments of level. This causes the reproduced letters to be uniformly spaced in the line when this deflection current is applied to the horizontal deflection coil 216 located in the yoke 48 of Fig. 1.

Vertical letter sweep for the deflection coil 218 in the yoke 48 is provided from the deflection system shown in Fig. 4A and is controlled by the sawtooth of voltage output appearing in a conductor 221. This sawtooth of voltage controls operation of a vertical deflection driver tube 222.

Horizontal deflection for letter scan in the kinescope 32 is provided by pulses appearing in a conductor 224, Figs. 4A and 7, applied to the gird 226 of a discharge tube 228. The output of the discharge tube is applied to the grid 229 of the driver tube 231. The plate circuit of the tube 231 includes the auxiliary horizontal deflection coil 52.

In the illustrative example when a 32 character message is observed on the screen of the kinescope 32, a means is necessary for phasing the horizontal sweep so that the first letter appears at the left end of the line of characters. Phasing is accomplished by means of a feedback loop from the last multivibrator 205 in the counter chain to the first multivibrator 201 through a normally open push-button switch 233. It will be understood that any convenient circuit making device may be used at the location 233. When the push-button switch 233 is closed, the capacity of the counter is reduced to 31 counts. This causes the observed line of characters to move toward the left giving somewhat the effect of a traveling electric sign. The push-button switch 233 is released when the phase is correct.

Fig. 9 of the drawing discloses an arrangement for performing selection operations in an additional area of the target of the cathode ray tube 31 of Fig. 1. The apparatus of Figs. 4 and 4A remains substantially unchanged and the apparatus of Fig. 9 is added as indicated in the following description. The target face of the cathode ray tube 31 or the mask associated with the tube face is provided with an additional set of indicia which may be in the form of numerals. In accordance with the description which is to follow, the additional area is located above the characters shown by Fig. 2 on the slide or mask 33.

In the description of Fig. 9, which follows, the multivibrators of Fig. 4, including the multivibrator 56, are designated by reference characters 301, 302, 303, 304 and 305 for the sake of convenience. It will be understood that the multivibrator 301 is or corresponds to the multivibrator 56 of Fig. 4.

It will be assumed that the apparatus of Figs. 4 and 4A is conditioned for operation as previously explained to select the characters shown on Fig. 2 then locking multivibrator 308 is "off," that is to say its right hand tube is conducting. Then driver tube 309 is cut off. The shift character on the tape or other code carrying medium, with phototubes 21, 22, 25 and 26 receiving light, causes multivibrators 301, 302, 304 and 305 to have their left hand tubes conducting. Then leads 321, 322, 324, 325 and 326 are rendered more negative or less positive simultaneously since they are connected to plates of the multivibrator tubes which are on. The lead 324 is connected to the plate of the left hand multivibrator tube. The leads 321, 322, 324, 325 and 326 have equal valued high resistors 371, 372, 373, 374 and 375 connected therein. A rectifier 376 is connected from the grid of the tube 328 to ground. When any one or more of leads is at a value corresponding to the off condition of its associated multivibrator tube, then the cathode to grid path of the tube is conductive and holds the grid at essentially cathode or ground potential. The rectifier 376 assists in this. As a result of the less positive potential on the leads 321, 322, 324, 325 and 326 simultaneously, due to occurrence of the special case shift code combination, tube 328 has its bias voltage brought from a value near cathode potential toward cutoff. A pulse on lead 331 which is connected to the plate of tube 86 is applied to the grid of a tube 333. When the grid of tube 328 is made more negative, as described, then its plate swings positive bringing the grid of tube 333 up to near cutoff from a low negative value. The pulse from lead 331 is differentiated and the sharp initial positive going pulse causes the grid of the tube 333 to swing above cutoff. As described in connection with Fig. 4, pulses on the lead 331 are somewhat delayed with respect to operation of multivibrators 301 to 305. A negative pulse is transmitted by way of a condenser 336 to the locking multivibrator 308. This is applied to the grid of the conducting tube in the multivibrator. The conducting tube of multivibrator 308 is thus turned off. The connection to the plate of the tube which is now off causes driver tube 309 to conduct. Its current is included in the vertical deflection coil 122 as indicated by the legend on the conductor 310. A means therefore is provided for performing selection operations on an additional area of the target of the cathode ray tube 31. This area may have an additional indicia pattern, for example, numerals and other special indicia to supplement the indicia appearing in Fig. 2. The associated apparatus can then function to perform equivalent selection in the new tube target area.

To restore selection to the area of Fig. 2, phototubes 21, 22, 24 to 26 receive illumination through or from the "unshift" character on the tape. The grid of tube 344 is made negative in a manner similar to that described for tube 328. Resistors 381, 382, 383, 384 and 385 are provided in the connections to the grid of the tube 344. The grid of tube 346 then is raised positively by the tube 344 and is responsive to the sharp positive pulse received via lead 331. A negative pulse is applied from the plate of tube 346 to the grid of the tube which is on in the multivibrator 308. Driver tube 309 is turned off restoring operation of Figs. 4 and 4A to normal.

What is claimed is:

1. A code translator or converter for receiving code pulses from a code pulse source comprising a bank of multivibrators, each multivibrator having an initial state of conduction, a multigrid tube for each multivibrator, means whereby each multivibrator biases its associated multigrid tube, a gating amplifier for each multivibrator, a connection from each of said gating amplifiers to the said multivibrator corresponding thereto, means to supply code pulses from said code pulse source to said gating amplifiers whereby to prepare said gating amplifiers for conduction, a multivibrator to supply pulses to said gating amplifiers delayed with respect to said code pulses whereby to cause said gating amplifiers to transmit said code pulses upon occurrence thereof, means to supply pulses to said last mentioned multivibrator derived from said code pulse source, means to bias one of the grids of said multigrid tubes by voltages such that the plate currents of these tubes have a ratio of one-two-four.

2. A code translator or converter comprising a set of multivibrators, each multivibrator having an initial state of conduction and being self restoring after a time interval to said initial state of conduction, a multigrid tube for each multivibrator, means whereby each multivibrator biases its associated multigrid tube to cutoff, means including a gating amplifier to cause operation of each multivibrator from its initial conductive state to cause conduction in its associated tube in response to a code unit signal, multivibrator means responsive to a recurring signal occurring substantially simultaneously with the code unit signals for delaying application of code unit signals to said multivibrators by way of said gating amplifiers, and means to bias one of the grids of said multigrid tubes by voltages such that the plate currents of the tubes have a ratio of one-two-four.

3. A code translator or converter comprising a set of multivibrators, each multivibrator having an initial state of conduction and being self restoring after a time interval to said initial state of conduction, a multigrid tube for each multivibrator, means whereby each multivibrator biases its associated multigrid tube to cutoff, means including a gating amplifier to cause operation of each multivibrator from its initial conductive state to cause conduction in its associated tube in response to a code unit signal, means including a multivibrator responsive to a recurring signal occurring substantially simultaneously with the code unit signals for delaying application of code unit signals to said multivibrators by way of said gating amplifiers, and means to bias one of the grids of said multigrid tubes by voltages such that the plate currents of the tubes have a ratio of one-two-four.

4. A code translator or converter for receiving code pulses from a code pulse source comprising a bank of single shot multivibrators, each multivibrator having an initial state of conduction, a multigrid tube for each multivibrator, means whereby each multivibrator biases its associated multigrid tube, a gating amplifier for each multivibrator, a connection from each of said gating amplifiers to the said multivibrator corresponding thereto, means to supply code pulses from said code pulse source to said gating amplifiers whereby to prepare said gating amplifiers for conduction, a multivibrator to supply pulses to said gating amplifiers delayed with respect to said code pulses whereby to cause said gating amplifiers to transmit said code pulses upon occurrence thereof, means to supply pulses to said last mentioned multivibrator derived from said code pulse source, means to bias one of the grids of said multigrid tubes by voltages such that the plate currents of these tubes have a ratio of one-two-four.

5. A code translator or converter for receiving code pulses from a code pulse source comprising a bank of single shot multivibrators, each of said multivibrators having an initial state of conduction, a multigrid tube for each of said multivibrators, means whereby each of said multivibrators biases its associated multigrid tube, a gating amplifier for each of said multivibrators, a connection from each of said gating amplifiers to the said multivibrator corresponding thereto, a multivibrator common to said gating amplifiers to supply delayed pulses to each of said gating amplifiers, means to bias one of the grids of said multigrid tubes by voltages such that the plate currents of these tubes have a ratio of one-two-four, and multivibrators controlled from said code pulse source for rendering said gating amplifiers conductive.

6. A code translator or converter comprising a bank of single shot multivibrators, each of said multivibrators having an initial state of conduction, a multigrid tube for each of said multivibrators, means whereby each of said multivibrators biases its associated multigrid tube, a gating amplifier for each of said multivibrators, connections from each of said gating amplifiers to each of said multivibrators, pulse differentiating means for each of said gating amplifiers, a multivibrator common to said single shot multivibrators, means to supply pulses through said pulse differentiating means from said common multivibrator to each of said gating amplifiers, means to bias one of the grids of said multigrid tubes by voltages such that the plate currents of these tubes have a ratio of one-two-four, code controlled multivibrators, and means whereby said code controlled multivibrators control said gating amplifiers.

7. A code translator or converter comprising a set of multivibrators, each multivibrator having an initial state of conduction and being self restoring after a time interval to said initial state of conduction, a multigrid tube for each multivibrator, means whereby each multivibrator biases its associated multigrid tube to cutoff, multivibrator means, means whereby said last named multivibrator means is operative to cause operation of each multivibrator from its initial conductive state to cause conduction in its associated tube in response to a code unit signal, means including a multivibrator responsive to a recurring signal occurring substantially simultaneously with the code unit signals, means whereby said last named means is operative to delay application of code unit signals to said multivibrators, and means to bias one of the grids of said multigrid tubes by voltages such that the plate currents of the tubes have a ratio of one-two-four.

8. A code translator or converter for receiving code pulses from a code pulse source comprising a bank of multivibrators, each multivibrator having an initial state of conduction, a multigrid tube for each multivibrator, means whereby each multivibrator biases its associated multigrid tube, a gating amplifier for each multivibrator, a connection from each of said gating amplifiers to the said multivibrator corresponding thereto, means to supply code pulses from said code pulse source to said gating amplifiers whereby to prepare said gating amplifiers for conduction, a multivibrator to supply pulses, means to differentiate and apply said last named pulses to said gating amplifiers delayed with respect to said code pulses whereby to cause said gating amplifiers to transmit said code pulses upon occurrence thereof, means to supply code pulses to said last named multivibrator derived from said code pulse source, and means to bias one of the grids of said multigrid tubes by voltages such that the plate currents of these tubes have a ratio of one-two-four.

No references cited.